(12) United States Patent
Oh

(10) Patent No.: US 8,680,524 B2
(45) Date of Patent: Mar. 25, 2014

(54) METHOD OF ARRANGING PADS IN SEMICONDUCTOR DEVICE, SEMICONDUCTOR MEMORY DEVICE USING THE METHOD, AND PROCESSING SYSTEM HAVING MOUNTED THEREIN THE SEMICONDUCTOR MEMORY DEVICE

(75) Inventor: Chi-sung Oh, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 13/174,824

(22) Filed: Jul. 1, 2011

(65) Prior Publication Data
US 2012/0002456 A1    Jan. 5, 2012

(30) Foreign Application Priority Data
Jul. 1, 2010   (KR) .................. 10-2010-0063432

(51) Int. Cl.
*H01L 29/04*   (2006.01)
*G01R 27/28*   (2006.01)

(52) U.S. Cl.
USPC ............... 257/50; 257/48; 257/203; 257/260; 257/E21.143; 257/E21.521; 257/E23.002; 326/56; 365/63; 716/119

(58) Field of Classification Search
USPC ............... 257/48, 50, 203, 260, E21.143, 257/E21.521, E23.002; 324/158.1; 326/56; 365/63; 716/119
See application file for complete search history.

(56) References Cited

U.S. PATENT DOCUMENTS

| 5,946,744 A * | 9/1999 | Peterson ............... 4/506 |
| 7,342,248 B2 * | 3/2008 | Sorimachi ............... 257/48 |
| 7,400,134 B2 * | 7/2008 | Morishita et al. ........ 324/762.02 |
| 7,910,922 B2 * | 3/2011 | Nishimura et al. ............ 257/50 |
| 8,396,682 B2 * | 3/2013 | Oh et al. ............... 702/120 |
| 2005/0030055 A1 * | 2/2005 | Tran et al. ............... 324/763 |
| 2011/0026295 A1 * | 2/2011 | Matsui ............... 365/63 |

FOREIGN PATENT DOCUMENTS

| JP | 2009-016750 A | 1/2009 |
| JP | 2009-239259 A | 10/2009 |
| KR | 1999-0061140 A | 7/1999 |

* cited by examiner

Primary Examiner — Dao H Nguyen
(74) Attorney, Agent, or Firm — Sughrue Mion, PLLC

(57) ABSTRACT

A method of arranging pads in a semiconductor memory device, the semiconductor memory device using the method, and a processing system having mounted therein the semiconductor memory device. The method includes classifying pads provided in a memory chip of the semiconductor memory device into monitoring pads configured for a memory chip test on a wafer, a package pads configured for wire connection in a package, and common pads configured for both the memory chip test on the wafer and wire connection in the package and arranging the monitoring pads and the package pads separately in columns on the memory chip.

7 Claims, 7 Drawing Sheets

METHOD OF ARRANGING PADS IN SEMICONDUCTOR DEVICE, SEMICONDUCTOR MEMORY DEVICE USING THE METHOD, AND PROCESSING SYSTEM HAVING MOUNTED THEREIN THE SEMICONDUCTOR MEMORY DEVICE

CROSS-REFERENCE TO RELATED APPLICATIONS

This application claims the benefit of Korean Patent Application No. 10-2010-0063432, filed on Jul. 1, 2010, in the Korean Intellectual Property Office, the disclosure of which is incorporated herein in its entirety by reference.

BACKGROUND

1. Field

Apparatuses and methods consistent with exemplary embodiments relate to arrangement of pads in a semiconductor device, and more particularly, to a method of arranging pads in a semiconductor device, a semiconductor memory device using the method, and a processing system having mounted therein the semiconductor memory device.

2. Description of the Related Art

A semiconductor memory device includes pads for enabling electrical connection with external devices. Signals associated with operations, such as command input, data read, and data write, are input to or output from the semiconductor memory device through the pads.

Manufacturing methods for semiconductor memory devices have become highly integrated, thereby reducing the size of the semiconductor memory device and reducing the production cost.

Although the degree of integration of devices mounted in a semiconductor memory device has doubled, the number of pads may or may not be increased. Conversely, if the degree of integration is reduced by half, the number of pads may or may not be decreased. Thus, in a high-integration memory device, the area of the pads is not an issue, but for a low-integration memory device, the area of the pads may be an issue. This is because, with the development of semiconductor device manufacturing technology, the chip size has been continuously decreasing while the pad size has decreased in a corresponding manner. In other words, despite of the reduction in overall chip size, pad size has not been reduced.

Thus, the rate of reduction in an interval between the pads or the pad size has not corresponded to the rate of increase in the degree of integration of the semiconductor memory devices. As a result, there is a related art overhead in the chip size due to the size of the pads, especially for low-integration memory devices.

SUMMARY

One or more exemplary embodiments provide a method of arranging pads in a semiconductor memory device.

One or more exemplary embodiments also provide a semiconductor memory device using the method of arranging pads in the semiconductor memory device.

One or more exemplary embodiments also provide a processing system having mounted therein the semiconductor memory device.

According to an aspect of an exemplary embodiment, there is provided a method of arranging pads in a semiconductor memory device, the method including classifying pads provided in a memory chip of the semiconductor memory device into monitoring pads configured for a memory chip test on a wafer, package pads configured for wire connection in a package, and common pads configured for both the memory chip test on the wafer and wire connection in the package and arranging the monitoring pads and the package pads separately in columns on the memory chip.

The package pads and the common pads may be arranged in a first column proximal to at least one edge on the memory chip, and the monitoring pads may be arranged in a second column adjacent to the first column, in which the package pads are arranged in the proximity of the monitoring pads. The size of each package pad may be smaller than the size of each monitoring pad.

According to an aspect of another exemplary embodiment, there is provided a semiconductor memory device including monitoring pads arranged on a memory chip and configured for a memory chip test on a wafer, package pads arranged on the memory chip and configured for wire connection in a package, and common pads arranged on the memory chip and configured for both the memory chip test on the wafer and wire connection in the package, in which the monitoring pads and the package pads are arranged in columns on the memory chip.

The package pads and the common pads may be arranged in a first column proximal to at least one edge on the memory chip, and the monitoring pads may be arranged in a second column adjacent to the first column, in which the package pads are arranged in the proximity of the monitoring pads. The size of each package pad may be smaller than the size of each monitoring pad.

According to an aspect of another exemplary embodiment, there is provided a processing system including a memory device storing data, a processor reading, writing, and processing data with respect to the memory device, and an input/output device receiving input of data from an external device, forwarding the data to the processor, and outputting the data processed by the processor, in which the memory device includes monitoring pads arranged on a memory chip and configured for a memory chip test on a wafer, package pads arranged on the memory chip and configured for wire connection in a package, and common pads arranged on the memory chip and configured for both the memory chip test on the wafer and wire connection in the package, in which the monitoring pads and the package pads are arranged in columns on the memory chip.

BRIEF DESCRIPTION OF THE DRAWINGS

The above and/or other aspects will become apparent and more readily appreciated from the following detailed description taken in conjunction with the accompanying drawings in which.

DETAILED DESCRIPTION OF EXEMPLARY EMBODIMENTS

Figure 1:
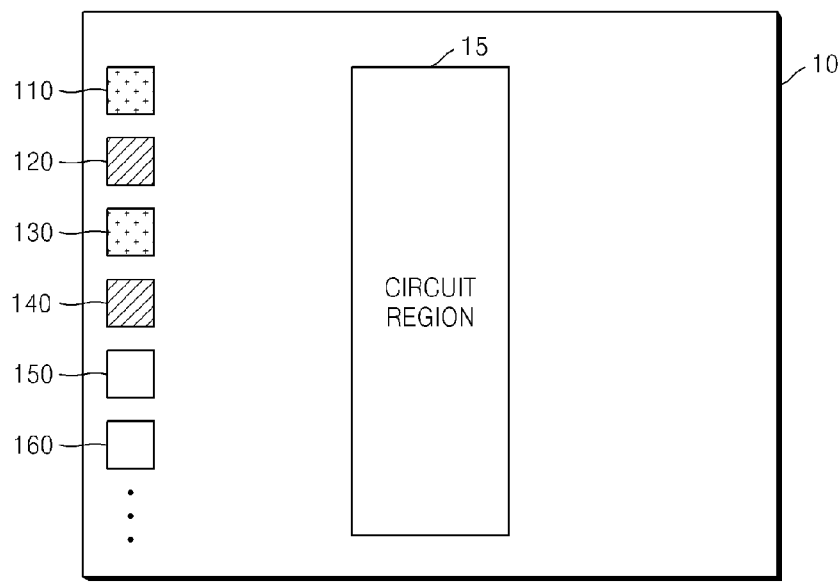
FIG. 1 schematically illustrates pads arranged in a column on a memory chip of a semiconductor memory device according to an exemplary embodiment.

Hereinafter, exemplary embodiments will be described in detail with reference to the accompanying drawings so as to be easily realized by a person having ordinary knowledge in the art. The exemplary embodiments may be embodied in various forms without being limited to the exemplary embodiments set forth herein. Descriptions of well-known parts are omitted for clarity and conciseness, and like reference numerals refer to like elements throughout.

Generally, a semiconductor memory device may be manufactured on a chip by forming a circuit on a wafer. Since the chip has relatively low strength and is may be contaminated by foreign impurities, the chip is packaged for protection. Before being packaged, the chip is tested for normal operation. After completion of packaging, the package is tested.

FIG. 1 schematically illustrates that pads are arranged in a column on a memory chip 10 of a semiconductor memory device. The pads are arranged in a left side of a circuit area 15 in the memory chip 10.

The pads may be classified into monitoring (i.e., first) pads 120 and 140, package (i.e., second) pads 110 and 130, and common (i.e., third) pads 150 and 160. The monitoring pads 120 and 140 are used when the memory chip 10 is tested on a wafer and not used when pads on a Printed Circuit Board (PCB) and pads on the memory chip 10 are wire-connected during the packaging. The package pads 110 and 130 are not used during the test of the memory chip 10 on the wafer and are used during the wire-connection. The common pads 150 and 160 are used both for the test of the memory chip 10 on the wafer and the wire-connection. However, when the pads are arranged in a column on the memory chip 10 as shown in FIG. 1, the pads occupy a substantially large portion of the area of the memory chip 10, which can be considered overhead with respect to the degree of integration for a low-integration memory chip.

Figure 2:
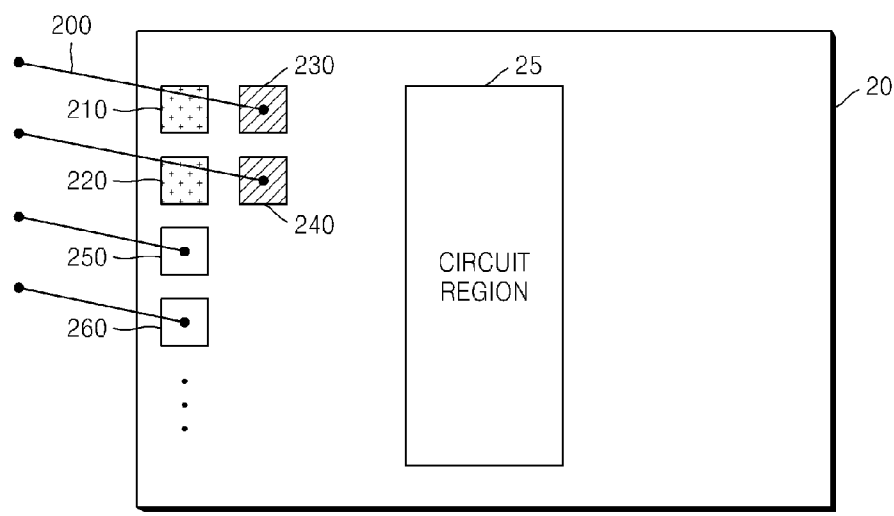
FIGS. 2 and 3 schematically illustrate pad arrangements on memory chips of semiconductor memory devices according to an exemplary embodiment.
Figure 3:
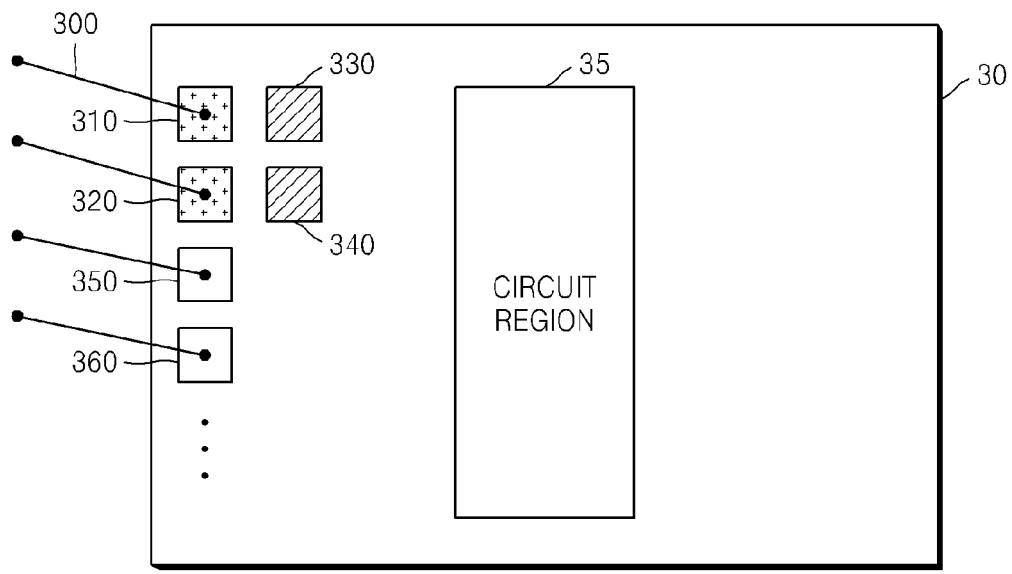

FIGS. 2 and 3 schematically illustrate pad arrangements on memory chips 20 and 30 of semiconductor memory devices according to an exemplary embodiment. A probe tip 200 of a probe station is connected to monitoring pads 230 and 240 to monitor a voltage or a direct current (DC) level of the memory chip 20. In FIG. 3, package pads 310 and 320 are connected with bonding pads (not shown) on a PCB of the semiconductor memory device through a wire 300.

Referring to FIGS. 2 and 3, monitoring pads 230, 240, 330, and 340 and package pads 210, 220, 310, and 320 on the memory chips 20 and 30 are arranged in a pattern, for example, in columns (e.g., two), respectively, proximal to edges of the memory chips 20 and 30. The package pads 210, 220, 310, and 320 and common pads 250, 260, 350, and 360 are arranged in a first column proximal to edges, and the monitoring pads 230, 240, 330, and 340 are arranged in a second column adjacent to the package pads 210, 220, 310, and 320. In the present exemplary embodiment, the number of pads is four; however, the a different number of pads may be substituted therefore without departing from the scope of the exemplary embodiments.

In another exemplary embodiment, the monitoring pads 230, 240, 330, and 340 and the common pads 250, 260, 350, and 360 may be arranged in the first column proximal to at least one edge of the memory chips 20 and 30, and the package pads 210, 220, 310, and 320 may be arranged in a second column, which is adjacent to the first column, so that the monitoring pads 230, 240, 330, and 340 are arranged in the proximity of the package pads 210, 220, 310, and 320. Referring to FIGS. 2 and 3, pads 210-260 and 310-360 are arranged in a left side of circuit areas 25 and 35 in the memory chips 20 and 0, respectively.

Figure 4:
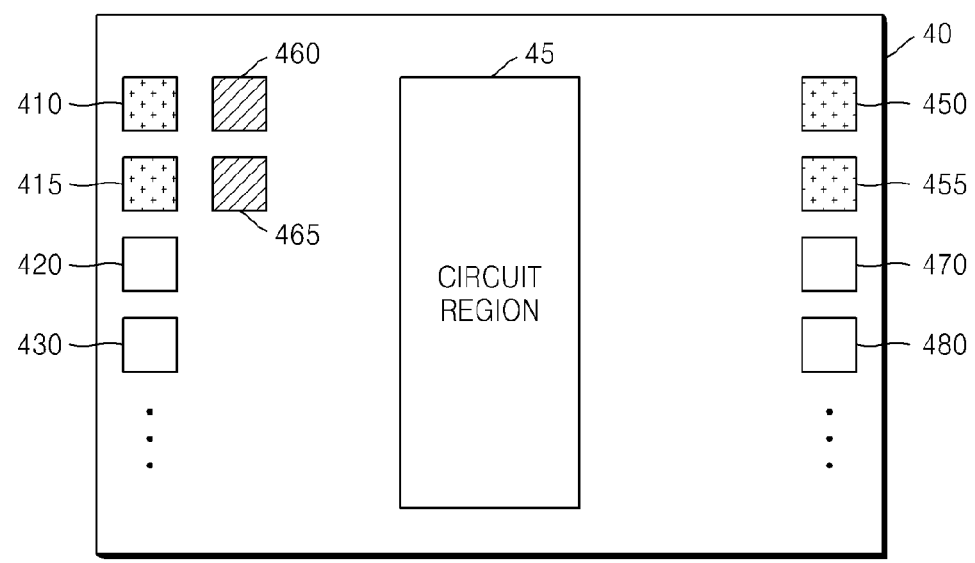
FIG. 4 schematically illustrates monitoring pads, package pads, and common pads arranged in columns (e.g., two) proximal to a left edge in a longitudinal direction of a memory chip and in a column proximal to a right edge in the longitudinal direction of the memory chip according to another exemplary embodiment.

FIG. 4 schematically illustrates that monitoring pads 460 and 465, package pads 410, 415, 450, and 455, and common pads 420, 430, 470, and 480 are arranged in columns (e.g., two) along a left edge in a direction (e.g., longitudinal) of a memory chip 40 and in a column along a right edge in the direction (e.g., longitudinal) of the memory chip 40 according to another exemplary embodiment. However, the monitoring pads 460 and 465, the package pads 410, 415, 450, and 455, and the common pads 420, 430, 470, and 480 may also be arranged in columns (e.g., two) proximal to the right edge and in a column proximal to the left edge. Referring to FIG. 4, pads 410 through 480 are arranged at left and right sides of a circuit area 45 in the memory chip 40.

Figure 5:
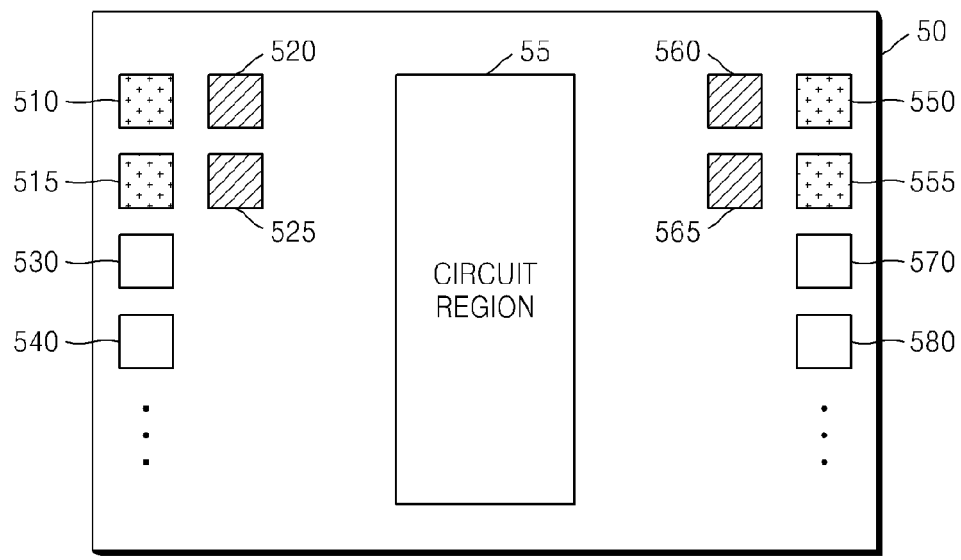
FIG. 5 schematically illustrates monitoring pads, package pads, and common pads arranged in columns (e.g., two), respectively, proximal to a right edge and a left edge in a longitudinal direction of a memory chip according to another exemplary embodiment.

FIG. 5 schematically illustrates that monitoring pads 520, 525, 560, and 565, package pads 510, 515, 550, and 555, and common pads 530, 540, 570, and 580 are arranged in columns (e.g., two), respectively, proximal to a right edge and a left edge in a direction (e.g., longitudinal) of a memory chip 50 according to another exemplary embodiment. Pads 510 through 580 are arranged at left and right sides of a circuit area 55 in the memory chip 50.

Figure 6:
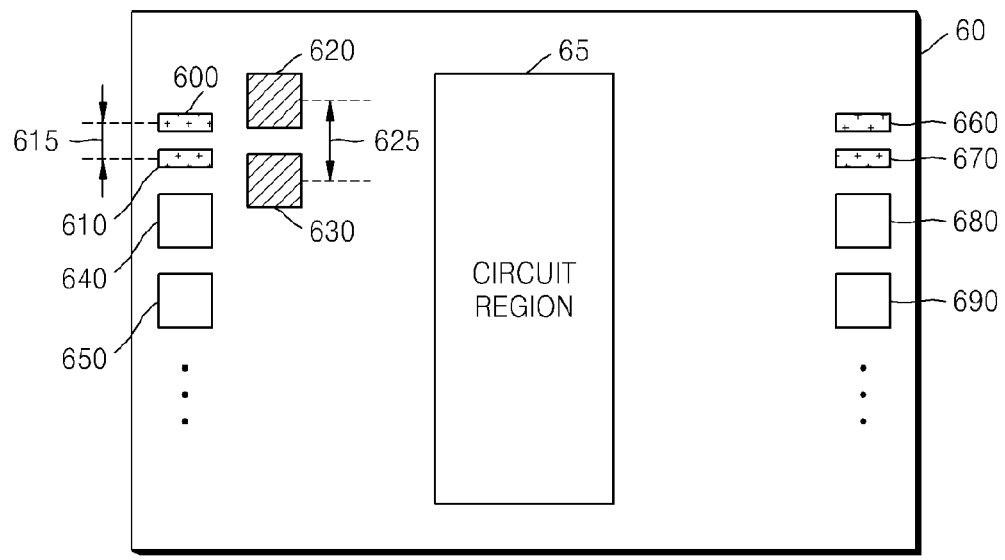
FIG. 6 schematically illustrates that the size of each package pad is smaller than the size of each monitoring pad according to another exemplary embodiment.

FIG. 6 schematically illustrates that the size of each of a plurality of package pads 600, 610, 660, and 670 is substantially smaller than the size of each of a plurality of monitoring pads 620 and 630 according to another exemplary embodiment. The size of each of a plurality of common pads 640, 650, 680, and 690 is substantially equal to the size of each of the monitoring pads 620 and 630. The pads 600 through 690 are arranged in left and right sides of a circuit area 65 in a memory chip 60.

In FIG. 6, a monitoring pad pitch 625 indicates that a distance between centers of the monitoring pads 620 and 630 is a multiple (e.g., two times) of a package pad pitch 615 indicating a distance between centers of the package pads 600 and 610. While the exemplary embodiment illustrates two as the multiple, other multiples may be substituted therefor.

Figure 7:
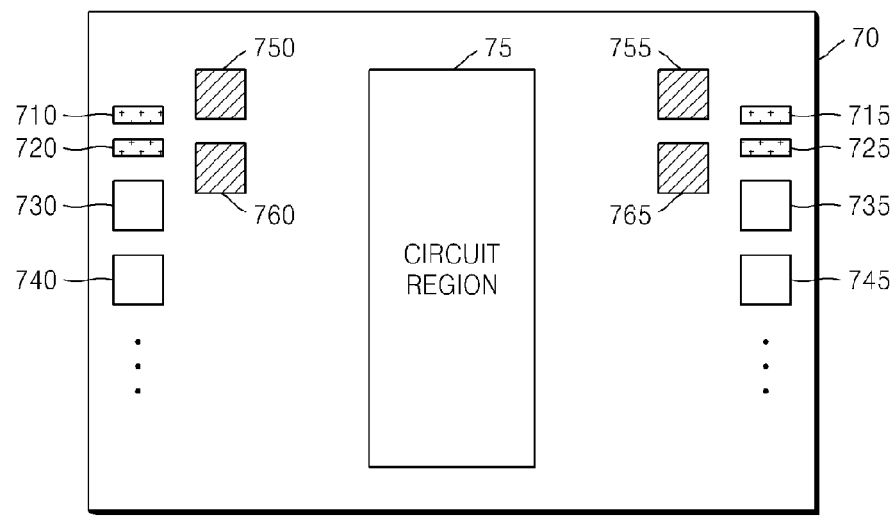
FIG. 7 schematically illustrates package pads and monitoring pads, which have different sizes, arranged in columns (e.g., two), respectively, proximal to a left edge and a right edge in a longitudinal direction of a memory chip according to another exemplary embodiment.

FIG. 7 schematically illustrates that package pads 710, 715, 720 and 725 and monitoring pads 750, 755, 760 and 765, which have different sizes, are arranged in columns (e.g., two), respectively, proximal to a left edge and a right edge in a longitudinal direction of a memory chip 70 according to another exemplary embodiment. The size of each of a plurality of common pads 730 through 745 is equal to the size of the monitoring pads 750 through 765. Pads 710 through 765 are arranged at left and right sides of a circuit area 75 in the memory chip 70.

Figure 8:
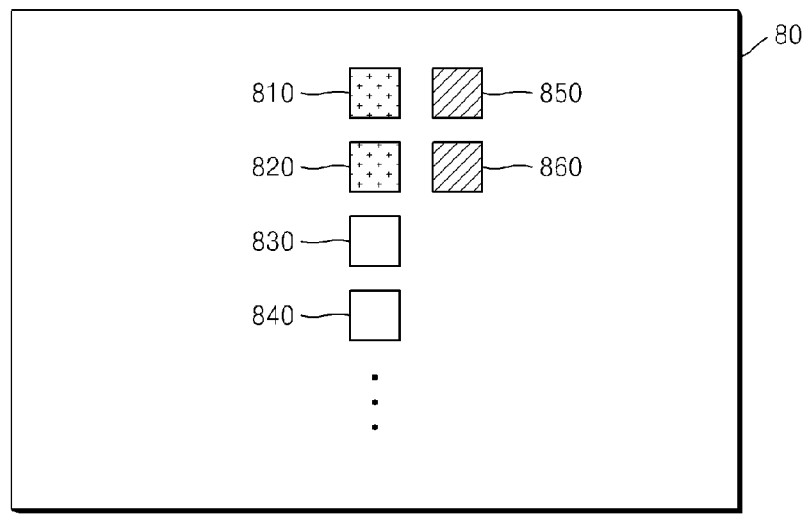
FIG. 8 schematically illustrates package pads and monitoring pads, which have different sizes, arranged in columns (e.g., two), respectively, along a central line in a longitudinal direction of a memory chip according to another exemplary embodiment.

FIG. 8 schematically illustrates that package pads 810 and 820 and common pads 830 and 840 are arranged in a first column along a central line in a direction (e.g., longitudinal) of a memory chip 80, and monitoring pads 850 and 860 are arranged in a second column adjacent to the first column, in which the package pads 810 and 820 are arranged in the proximity of the monitoring pads 850 and 860, according to another exemplary embodiment. The pads 810 through 860 may be arranged in a plurality of columns (e.g., two), respectively, at a left side and at a right side with respect to the central line. In this exemplary embodiment, there would be a total of four columns. The exemplary embodiments are not limited to four columns, and the number of columns may differ as would be understood by those skilled in the art.

Figure 9:
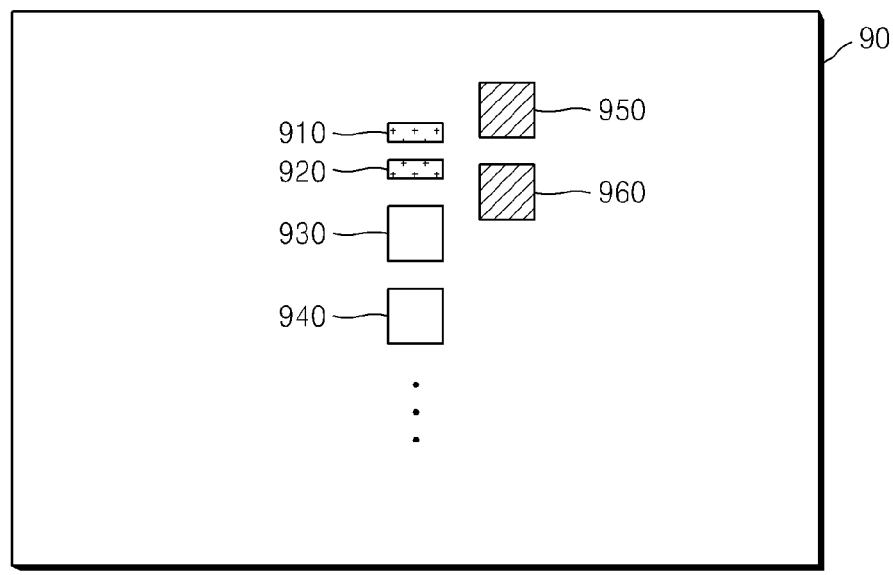
FIG. 9 schematically illustrates that the size of each package pad is smaller than that of each monitoring pad in FIG. 8 according to another exemplary embodiment.

FIG. 9 schematically illustrates that the size of each package pad 910 and 920 is smaller than that of the monitoring pads 950 and 960 in a memory chip 80 according to another exemplary embodiment. The size of each of a plurality of common pads 930 and 940 is substantially equal to the size of the monitoring pads 950 and 960, and substantially different from the size of the package pads 910 and 920.

Figure 10:
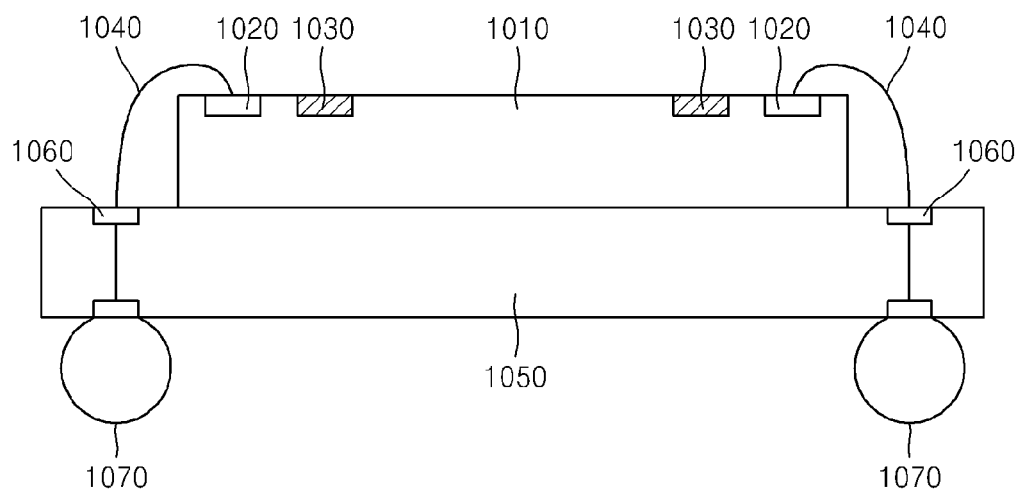
FIG. 10 is a cross-sectional view of a semiconductor memory device according to an exemplary embodiment.

FIG. 10 is a cross-sectional view of a semiconductor memory device according to an exemplary embodiment. Monitoring pads 1030 and package pads 1020 are arranged in columns (e.g., two), respectively, proximal to a right edge and a left edge of a memory chip 1010, and bonding pads 1060 and solder balls 1070 are arranged on a PCB 1050. The package pads 1020 on the memory chip 1010 are coupled to the bonding pads 1060 of the PCB 1050 through wires 1040, and are also connected with the solder balls 1070 through the wires.

Figure 11:
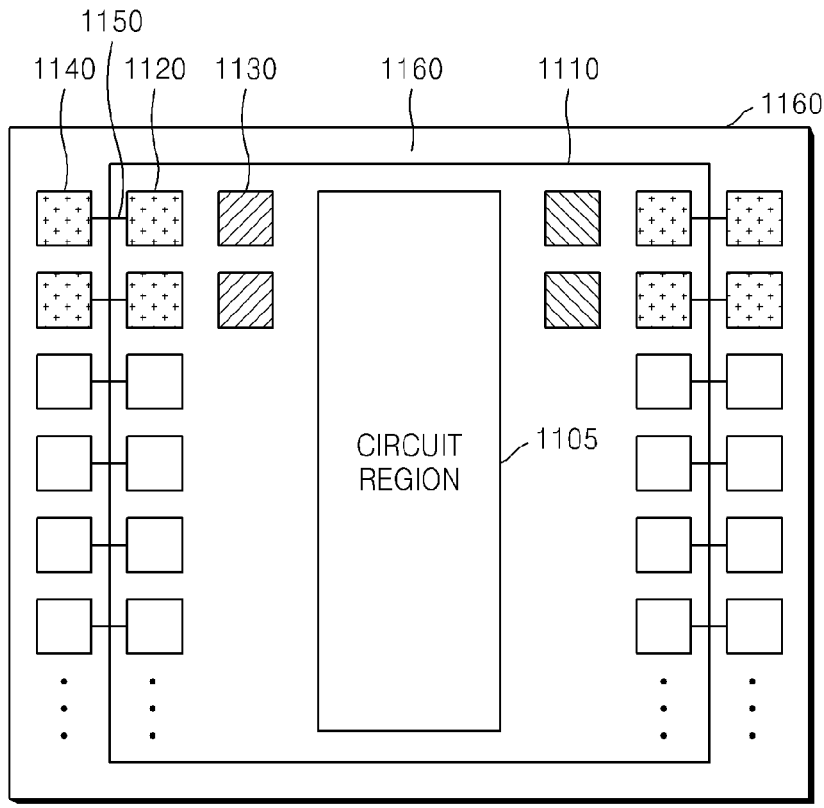
FIG. 11 is a plane view of a semiconductor memory device according to an exemplary embodiment.

FIG. 11 is a plane view of a semiconductor memory device according to an exemplary embodiment. Monitoring pads 1130 and package pads 1120 are arranged in columns (e.g., two), respectively, at a left side and in a right side with respect to a circuit region 1105 on a memory chip 1110, and the package pads 1120 are connected with bonding pads 1140 of a PCB 1160 through wires 1150.

Figure 12:
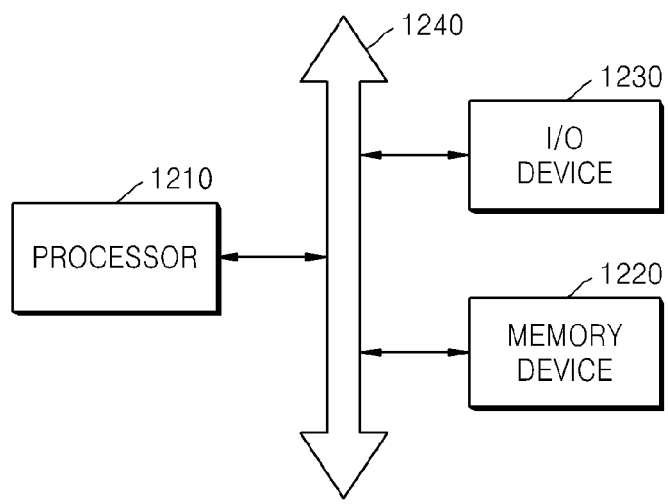
FIG. 12 is a block diagram of a processing system having mounted therein a semiconductor memory device according to an exemplary embodiment.

FIG. 12 is a block diagram of a processing system having mounted therein a semiconductor memory device according to an exemplary embodiment. The processing system includes a processor 1210, a memory device 1220, a system bus 1240, and an input/output (I/O) device 1230.

The processor 1210 performs data read, data write, and data processing operations with respect to the memory device 1220. The memory device 1220 stores data by using the semiconductor memory device according to the foregoing exemplary embodiments. The I/O device 1230 receives data from an external device, forwards the data to the processor 1210, and outputs data processed by the processor 1210. The processor 1210, the memory device 1220, and the I/O device 1230 may be coupled by way of a system bus 1240. Exemplary processing systems may include (but are not limited to) electronic devices using a memory device, such as a cellular phone, a computer, a complex device, a Personal Digital Assistant (PDA), a netbook, or a camera.

Figure 13:
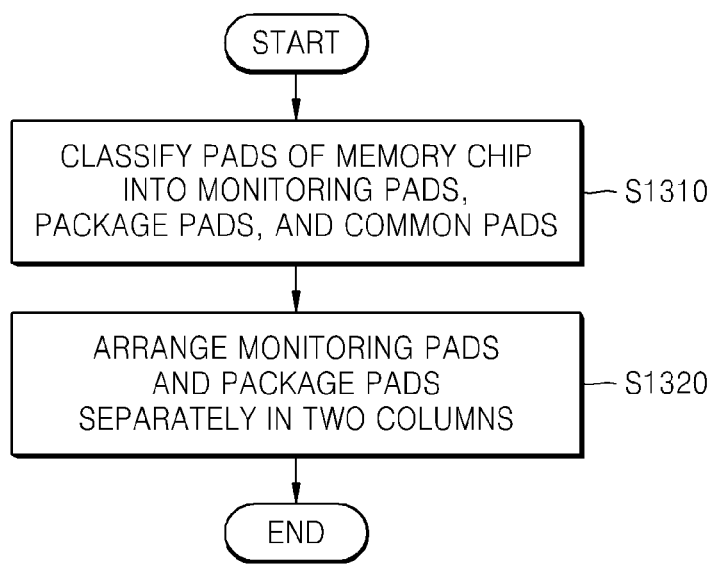
FIG. 13 is a flowchart illustrating a method of arranging pads in a semiconductor memory device according to an exemplary embodiment.

FIG. 13 is a flowchart illustrating a method of arranging pads in a semiconductor memory device according to an exemplary embodiment. Pads provided on a memory chip of a semiconductor memory device are classified into monitoring pads, package pads, and common pads which are used for both memory chip test on a wafer and wire connection in a package, in operation S1310. The monitoring pads and the package pads are arranged (e.g., separately) in columns (e.g., two) on the memory chip, in operation S1320. The package pads and the common pads are arranged in a first column proximal to at least one edge of the memory chip, and the monitoring pads are arranged in a second column adjacent to the first column, in which the package pads are arranged in the proximity of the monitoring pads. The monitoring pads and the common pads are arranged in the first column proximal to at least one edge of the memory chip, and the package pads are arranged in the second column adjacent to the first column, in which the monitoring pads are arranged in the proximity of the package pads.

The package pads and the common pads are arranged in the first column along a central line in a longitudinal direction of the memory chip, and the monitoring pads are arranged in the second column adjacent to the first line, in which the package pads are arranged in the proximity of the monitoring pads. The size of each package pad may be substantially smaller than that of each monitoring pad. The monitoring pad pitch indicating a distance between centers of adjacent monitoring pads (e.g., two) may be a multiple (e.g., two) times the package pad pitch, indicating a distance between centers of adjacent package pads (e.g., two).

While the exemplary embodiments have been disclosed for illustrative purposes, those skilled in the art will appreciate that various modifications and other embodiments are possible, without departing from the scope and spirit of the present inventive concept as defined by the appended claims.

What is claimed is:

1. A method of arranging pads in a memory chip of a semiconductor memory device, comprising:
    classifying pads provided in the memory chip into,
        a plurality of monitoring pads configured for a memory chip test on a wafer,
        a plurality of package pads configured for wire connection in a package, and
        a plurality of common pads configured for both the memory chip test on the wafer and wire connection in the package; and
    arranging the plurality of monitoring pads and the plurality of package pads in columns on the memory chip,
    wherein the arranging comprises arranging the plurality of package pads in a first column proximal to at least one edge of the memory chip and along the least one edge of the memory chip, and arranging the plurality of monitoring pads in a second column adjacent to the first column, the second column being more distant from the at least one edge of the memory than the first column.

2. The method of claim 1,
    wherein the plurality of monitoring pads are not figured for wire connection in the package, and the plurality of package pads are not configured for the memory chip test.

3. The method of claim 1, wherein the arranging the plurality of monitoring pads and the plurality of package pads comprises arranging the common pads in the first column proximal to the at least one edge of the memory chip in which the plurality of package pads are arranged in the proximity of the plurality of monitoring pads.

4. The method of claim 1, wherein each of the plurality of package pads is smaller than each of the plurality of monitoring pads.

5. The method of claim 4, wherein a monitoring pad pitch indicating a distance between centers of adjacent ones of the plurality of monitoring pads is about two times a package pad pitch indicating a distance between centers of adjacent ones of the plurality of package pads.

6. A method of arranging pads in a memory chip of a semiconductor memory device, comprising:
classifying pads provided in the memory chip into,
a plurality of monitoring pads configured for a memory chip test on a wafer,
a plurality of package pads configured for wire connection in a package, and
a plurality of common pads configured for both the memory chip test on the wafer and wire connection in the package; and
arranging the plurality of monitoring pads and the plurality of package pads in columns on the memory chip,
wherein the arranging comprises arranging the plurality of monitoring pads and the plurality of common pads in a first column proximal to at least one edge of the memory chip and along the least one edge of the memory chip, and arranging the plurality of package pads in a second column adjacent to the first column, in which the plurality of monitoring pads are arranged in the proximity of the plurality of package pads, and the second column is more distant from the at least one edge of the memory than the first column.

7. A method of arranging pads in a memory chip of a semiconductor memory device, comprising:
classifying pads provided in the memory chip into,
a plurality of monitoring pads configured for a memory chip test on a wafer,
a plurality of package pads configured for wire connection in a package, and
a plurality of common pads configured for both the memory chip test on the wafer and wire connection in the package; and
arranging the plurality of monitoring pads and the plurality of package pads in columns on the memory chip,
wherein the arranging comprises arranging the plurality of package pads and the plurality of common pads in a first column on a central line on the memory chip, and arranging the plurality of monitoring pads in a second column adjacent to the first column, in which the plurality of package pads are arranged in the proximity of the plurality of monitoring pads.

* * * * *